Oct. 7, 1941.   E. G. ROCHOW   2,258,220
RESINOUS MATERIALS AND INSULATED CONDUCTORS AND
OTHER PRODUCTS UTILIZING THE SAME
Filed April 27, 1940

Fig.1.

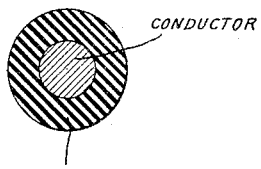

CONDUCTOR

INSULATION COMPRISING A RESIN COMPOSED OF POLYMERIC ETHYL
SILICON OXIDES, SAID RESIN CONTAINING AN AVERAGE OF
FROM 0.5 TO 1.5 ETHYL RADICALS PER SILICON ATOM

Fig.2.

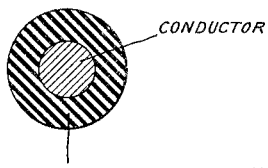

CONDUCTOR

INSULATION COMPRISING AN INTIMATE ASSOCIATION OF
FIBROUS MATERIAL AND A RESIN COMPOSED OF POLYMERIC
ETHYL SILICON OXIDES, SAID RESIN CONTAINING AN AVERAGE
OF FROM 0.5 TO 1.5 ETHYL RADICALS PER SILICON ATOM

Inventor:
Eugene G. Rochow,
by Harry E. Dunham
His Attorney.

Patented Oct. 7, 1941

2,258,220

UNITED STATES PATENT OFFICE 2,258,220

RESINOUS MATERIALS AND INSULATED CONDUCTORS AND OTHER PRODUCTS UTILIZING THE SAME

Eugene G. Rochow, West Albany, N. Y., assignor to General Electric Company, a corporation of New York Application April 27, 1940, Serial No. 332,097

17 Claims. (Cl. 174—121)

The present invention relates to new compositions of matter and, more particularly, to compositions comprising new and useful resinous materials constituted essentially of oxygen atoms and ethyl radicals each bonded to silicon atoms. Specifically the invention is concerned with compositions comprising a substance corresponding to the formula $$(C_2H_5)_x SiO_{\frac{4-x}{2}}$$

where $x$ is a number between 0.5 and 1.5. These new resinous complexes (resinous polymers or condensation products) also may be described as being products of dehydration of a mixture of different ethyl silicols, which products have a unit structure corresponding substantially to the formula $$(C_2H_5)_x SiO_{\frac{4-x}{2}}$$

where $x$ is a number between 0.5 and 1.5. The scope of the invention also includes products wherein these new compositions are utilized, for example insulated electrical conductors comprising a metallic conductor and insulation thereon comprising the new compositions of this invention.

In the chemical literature the name "silicone" is given to compounds of the general formula

and their polymers, where R and R' are the same or different alkyl or aryl radicals or any other organic radicals capable of direct union with the silicon atom. The compound diethyl silicone, $(C_2H_5)_2SiO$, is known. It was prepared by Martin and Kipping (see Journal of the Chemical Society, 95, 302) from pure diethylsilicon dichloride and is described by these investigators as an oil having about the same consistency as glycerol. However, to the best of my knowledge and belief no one prior to my invention produced compositions composed essentially of oxygen atoms and ethyl radicals each bonded to silicon atoms and wherein the average ratio of ethyl radicals per silicon atom is from 0.5 to 1.5.

By suitable adjustment of the proportions of starting reactants thereby to obtain the above stated ethyl-to-silicon ratio in the final product, I have surprisingly found that new and valuable resinous complexes can be obtained. These new resinous materials are, in advanced stages of polymerization, solid or semi-solid bodies or thick, syrupy, almost non-flowing liquids having valuable and characteristic properties that make them particularly useful in industry, for example as electrically insulating materials and in the plastics and coating arts. They are quite different in their chemical constitution and in their properties from the oily diethyl silicone obtained by Martin and Kipping.

Any suitable method may be used in preparing the resinous complexes of this invention, the choice of the method being made largely on the basis of the yield obtained. For example, these new synthetic compositions may be prepared by hydrolyzing a mixture containing ethyl silicon halides (e. g., ethyl silicon chlorides, bromides, iodides, etc.) containing an average of from approximately 0.5 to 1.5 ethyl radicals per silicon atom. Usually the mixed ethyl silicon halides comprise mainly a mixture of ethyl silicon di- and tri-halides. Some ethyl silicon mono-halide also may be present. The hydrolysis product is partially or substantially completely dehydrated, as desired or as conditions may require, to form the resinous products of this invention.

In order that those skilled in the art better may understand how the present invention may be carried into effect, the following illustrative examples thereof are given:

*Example 1*

(A) An ether solution of 0.75 mol of ethyl magnesium bromide was added slowly with stirring to an ether solution of one mol of silicon tetrachloride. The reaction mixture was refluxed for 1½ hours to form a mixture of ethyl silicon chlorides.

(B) The ethyl silicon chlorides were hydrolyzed by pouring the reaction mass upon cracked ice, thereby converting the silicon chlorides to the corresponding silicols.

(C) The ether solution of silicols was separated, washed with water to remove acids, and then concentrated by distilling off substantially all of the ether. The resulting product was a yellow, viscous liquid containing the initial and intermediate condensation products of the silicols.

(D) On exposure to the air at room temperature the liquid product continued to condense with loss of water and hardened to a yellow, horny, insoluble and infusible resinous material. An analysis of this material showed that it corresponded approximately to the formula $$(C_2H_5)_{0.8} SiO_{1.6}$$

It will be understood, of course, that "Si" in the above formula and in all other formulas herein has reference to one silicon atom.

Example 2

Essentially the same procedure was followed as described under steps (A), (B) and (C) of Example 1 except that one mol ethyl magnesium bromide was used per mol silicon tetrachloride.

The viscous liquid product obtained by hydrolysis of the mixture of ethyl silicon chlorides was heated for two hours at 158° C., yielding a sticky resin. Analysis of this resin showed that it corresponded approximately to the formula $$(C_2H_5)_{1.1}SiO_{1.45}$$

When such a resin is heated to 240° C. it partly melts, then hardens to a brittle solid.

Example 3

Essentially the same procedure was followed as described under steps (A), (B) and (C) of Example 1 except that 1.25 mols ethyl magnesium bromide per mol silicon tetrachloride were used.

A syrupy, slightly yellow liquid was obtained upon evaporation of the ether from the hydrolysis product. The viscosity of this liquid increased somewhat upon heating for 23 hours at 155° C. When heated for an additional 24 hours at 175° C., a resinous material which scarcely flowed at room temperature was obtained. An analysis of this material showed that it corresponded approximately to the formula $$(C_2H_5)_{1.25}SiO_{1.38}$$

When this resin is heated for an additional 24 hours at about 200 C. it is converted into a rubbery polymer or condensation product.

Products also may be prepared wherein the average number of ethyl groups per silicon atom is of the order of 1.5 to 1, but silicols having such a ratio of ethyl radicals to silicon are, due to their volatility, more difficult to condense or polymerize to resinous bodies by heating at atmospheric pressure. The condensation of such more highly ethylated silicols is facilitated by effecting condensation under superatmospheric pressure or, more economically and conveniently, in the presence of a suitable dehydrating agent, numerous examples of which are disclosed in my copending application Serial No. 332,605, filed April 30, 1940.

Products also may be prepared wherein the average number of ethyl groups per silicon atom is of the order of 0.5 to 1. When the average ratio of ethyl radicals per silicon atom is materially below 0.5, e. g., an average of 0.4 ethyl radicals per silicon atom, I have found that condensation even at room temperature proceeds with undesirable rapidity and cannot be controlled. The resulting products are very hard, brittle, insoluble masses of little or no commercial utility in electrical, plastics and coating applications such as hereafter described. Furthermore, with ethyl-to-silicon ratios substantially below 0.5 to 1, undesirable quantities of silica are precipitated from the hydrolyzed mixture, causing a waste of the starting reactant (silicon tetrachloride) and making more difficult the isolation of the ethyl derivative.

For most applications of these dehydrated mixed ethyl silicols, I prefer that the ratio of ethyl radicals per silicon atom be within the range of about 0.7 to about 1.3 ethyl radicals for each silicon atom. Within these ranges products having the widest general application are obtained most readily and economically. A resinous polymer of particular utility is one having a unit structure corresponding to the formula $$(C_2H_5)_xSiO_{\frac{4-x}{2}}$$

where $x$ is approximately 1.

To illustrate how the resinous materials of this invention may be used in industry, the following examples are cited:

A liquid coating composition comprising a volatile solvent and a soluble, resinous partial dehydration product (partial condensation product or polymer) of different ethyl silicols, such as above described, is applied to a metallic conductor such as a copper wire. Thereafter the coated wire is heated to vaporize the solvent and to continue or complete the condensation or polymerization of the resin in situ. In manufacturing certain kinds of electrical cables it may be desirable to wrap the conductor with an organic or an inorganic fibrous material such as asbestos, glass, cotton or paper before treating it with the liquid resin. A further procedure is to coat and at least partly impregnate the wrapped conductor with the liquid resin, wind the thus insulated conductor into the desired coil, and then heat the wound coil to solidify the resin. In the accompanying drawing Fig. 1 represents a cross-sectional view of a metallic conductor provided with insulation comprising a resin or polymer composed of polymeric ethyl silicon oxides (Si-ethyl silicon oxides), said resin containing an average of from 0.5 to 1.5 ethyl radicals per silicon atom; and Fig. 2 shows a similar view of a metallic conductor provided with insulation comprising an intimate association of fibrous material and a resin such as described above with reference to Fig. 1.

Sheet insulation may be prepared by treating woven or felted organic fabrics or paper with compositions comprising the herein-described dehydrated silicols. Sheet insulation also may be prepared by binding flaky inorganic substances with these new resins. For example, the compositions of this invention may be used in the production of laminated mica products comprising mica flakes cemented and bonded together with these new substances. Self-supporting coherent films or sheets of clay such as bentonite also may be treated to advantage with compositions comprising a resinous polymer composed essentially of oxygen atoms and ethyl radicals each bonded to silicon and wherein the ratio of ethyl radicals per silicon atom is between 0.5 and 1.5. Such treated films may be produced as described more fully in, for example, my copending application Serial No. 287,787, filed August 1, 1939.

In addition to their use in the field of insulation, the resinous bodies of this invention also may be used as protective coatings, for instance as coatings for base members such as glass bulbs or other articles of glass, also for coating metals such as iron, steel, copper, etc. They also may be used as sealing compositions, in the production of so-called resistance or semi-conducting paints, and for other applications as described more fully in my copending applications Serial No. 287,787 and 296,819 (filed September 27, 1939) with particular reference to methyl silicones and halogenated aryl silicones. The soluble, partial dehydration products of different ethyl silicols used in the liquid coating and other compositions described above may be said to be products which, when substantially completely dehydrated or condensed, have a unit structure corresponding to the formula $$(C_2H_5)_xSiO_{\frac{4-x}{2}}$$

where $x$ is a number between 0.5 and 1.5, e. g., about 0.7 or 0.8 to 1.2 or 1.3. Any volatile solvent capable of dissolving the resinous partial condensation products of this invention may be used in preparing liquid coating compositions therefrom. Examples of such solvents are benzene, toluene, ether, acetone, etc.

In certain cases it may be desirable to copolymerize mixtures of compounds having a particular ratio of ethyl radicals per silicon atom in the molecule of the individual compound. This may be done, for example, by mixing suitable proportions of ethyl silicon chlorides containing an average of, say, 0.6 ethyl radical per silicon atom with ethyl silicon chlorides containing an average of, say, 1.4 ethyl radicals per silicon atom, hydrolyzing the mixture and partially or substantially completely dehydrating the resulting product. In other cases, the separately hydrolyzed products may be mixed and thereafter dehydrated. However, in such cases the components should be mixed before condensation has advanced to the point where the bodies are incompatible. For other applications it may be desirable to polymerize or condense the liquid resins to solid form and then mix and grind the materials together to form a composite mass.

In a manner similar to that described above compositions comprising the partially or substantially completely dehydrated silicols of this invention may have incorporated therein various polymerizable or polymerized silicones. Examples of silicones (and of substances from which they are derived), which thus may be used to modify the ethyl derivatives of this invention, are those described in my copending applications Serial Nos. 287,787, 296,819, 332,098, filed April 27, 1940, and 332,099, also filed April 27, 1940. Thus, polymerizable compositions may be prepared by mixing polymerizable silicones such, for example, as polymerizable methyl silicones, halogenated or non-halogenated aryl silicones, aroxyaryl silicones, methyl aryl silicones, etc., with the herein-described partial dehydration products of different ethyl silicols. The resulting polymerizable mixtures then may be interpolymerized (co-condensed) under heat or under heat and pressure, and in the presence or absence of a condensation or polymerization catalyst or a dehydrating agent, to obtain polymerized products having properties different from the separately polymerized components. Also, if desired, polymeric silicones such as those mentioned above, may be suitably compounded with the polymerizable or polymerized resinous ethyl derivatives of silicon oxide of this invention. In these and other ways modified or unmodified ethyl-substituted silicon compounds having properties best adapted for a particular service application may be prepared.

The individual, copolymerized or mixed liquid, semi-solid or solid ethyl derivatives of this invention may be suitably incorporated into other materials to modify the properties of the latter. For example, they may be compounded with substances such as natural and synthetic rubber; tars, asphalts and pitches, more specific examples of which are wood tars, petroleum asphalts and vegetable pitches; natural resins such as wood rosin, copal, shellac, etc.; synthetic resins such as phenol-aldehyde resins, urea-aldehyde resins, modified and unmodified alkyd resins, cumar resins, vinyl resins, esters of acrylic and methacrylic acids, etc.; cellulosic materials such as paper, inorganic and organic esters of cellulose such as cellulose nitrate (pyroxylin), cellulose acetate including the triacetate, cellulose propionate, cellulose butyrate, etc, cellulose ethers such as methyl celulose, ethyl cellulose, benzyl cellulose, etc., as well as with various other organic plastic compositions. In some cases the hard polymers of this invention may be pulverized and used as fillers for substances such as above mentioned. In other cases, especially when the ethyl derivative is compatible with the substance with which it is to be incorporated, it may be in the form of a liquid or relatively soft polymer of low molecular weight prior to compounding with the substance to be modified.

These new ethyl derivatives of silicon oxide also may be compounded with various other materials. For example, the hard, brittle ethyl derivatives may be plasticized by the addition of suitable plasticizing agents, or the ethyl derivatives in liquid state or in the form of polymers of low softening point themselves may be used as plasticizers of other normally brittle substances.

The low molecular weight resinous polymers of this invention also may be dissolved or dispersed in oils, such as linseed oil, Chinawood oil, perilla oil, soya bean oil, etc., alone or mixed with solvents, pigments, plasticizers, driers and other compounds of coating compositions to yield products which, when applied to a base member and air-dried or baked, have improved heat resistance.

Laminated products may be made by superimposing organic or inorganic fibrous sheet materials coated and impregnated with these new resinous compositions and thereafter bonding the sheets together under heat and pressure. Molding compositions and molded articles also may be formed from these new resins. If desired, filling materials such as asbestos, glass fibers, talc, quartz powder, wood flour, etc., may be incorporated into such compositions prior to molding. Shaped articles are formed from such compositions under heat or under heat and pressure in accordance with practices now widely used in the plastics arts.

What I claim as new and desire to secure by Letters Patent of the United States is:

1. A composition comprising a substance corresponding to the formula $$(C_2H_5)_xSiO_{\frac{4-x}{2}}$$

where $x$ is a number between 0.5 and 1.5.

2. A product of dehydration of a mixture of different ethyl silicols, said product having a unit structure corresponding substantially to the formula $$(C_2H_5)_xSiO_{\frac{4-x}{2}}$$

where $x$ is a number between 0.5 and 1.5.

3. A product as in claim 2 wherein $x$ has a value between approximately 0.7 and 1.3.

4. A product comprising a resinous material composed of polymeric Si-ethyl silicon oxides, the ethyl radicals being present in the polymer in the average ratio of from 0.5 to 1.5 ethyl radicals for each silicon atom.

5. A resinous polymer having a unit structure corresponding to the formula $$(C_2H_5)_xSiO_{\frac{4-x}{2}}$$

where $x$ is approximately 1.

6. A polymerizable composition comprising a mixture of at least two different polymerizable materials, one of which is a polymerizable silicone and the other of which is a partial dehydration product of a mixture of different ethyl silicols, said product when substantially completely dehydrated having a unit structure corresponding to the formula $$(C_2H_5)_xSiO_{\frac{4-x}{2}}$$

where $x$ is a number between 0.5 and 1.5.

7. The polymerized composition of claim 6.

8. A polymerizable composition comprising a mixture of polymerizable methyl silicone and a partial dehydration product of a mixture of different ethyl silicols, said product when substantially completely dehydrated having a unit structure corresponding to the formula $$(C_2H_5)_xSiO_{\frac{4-x}{2}}$$

where $x$ is a number between 0.5 and 1.5.

9. The polymerized composition of claim 8.

10. A polymerizable composition comprising a mixture of polymerizable aryl silicone and a partial dehydration product of a mixture of different ethyl silicols, said product when substantially completely dehydrated having a unit structure corresponding to the formula $$(C_2H_5)_xSiO_{\frac{4-x}{2}}$$

where $x$ is a number between 0.5 and 1.5.

11. The polymerized composition of claim 10.

12. A liquid coating composition comprising a volatile solvent and a soluble partial dehydration product of a mixture of different ethyl silicols, said product when substantially completely dehydrated having a unit structure corresponding to the formula $$(C_2H_5)_xSiO_{\frac{4-x}{2}}$$

where $x$ is a number between 0.5 and 1.5.

13. An article of manufacture comprising a base member having thereon an insoluble coating of a composition comprising a resinous complex composed of polymeric Si-ethyl silicon oxides, the ethyl radicals being present in the polymer in the average ratio of from 0.5 to 1.5 ethyl radicals for each silicon atom.

14. The method of preparing new synthetic compositions which comprises hydrolyzing a mixture containing ethyl silicon halides, said halides containing an average of from 0.5 to 1.5 ethyl radicals per silicon atom, and dehydrating the hydrolyzed product.

15. An insulated electrical conductor comprising a metallic conductor and insulation thereon comprising a resinous material composed of polymeric Si-ethyl silicon oxides, the ethyl radicals being present in the polymer in the average ratio of from 0.5 to 1.5 ethyl radicals for each silicon atom.

16. An electrical cable comprising a metallic conductor and insulation thereon comprising an intimate association of fibrous inorganic material and a composition comprising a product of dehydration of different ethyl silicols, said product having a unit structure corresponding to the formula $$(C_2H_5)_xSiO_{\frac{4-x}{2}}$$

where $x$ is a number between 0.5 and 1.5.

17. A composition comprising a mixture containing an organic plastic composition and a resinous material composed of polymeric Si-ethyl silicon oxides, the ethyl radicals being present in the polymer in the average ratio of from 0.5 to 1.5 ethyl radicals for each silicon atom.

EUGENE G. ROCHOW.